United States Patent [19]

Hovstøet al.

[11] Patent Number: 5,743,378
[45] Date of Patent: Apr. 28, 1998

[54] DEVICE FOR STABILIZING THE CONVEYOR BELT IN A SELF-ADJUSTING BELT STEERING ASSEMBLY

[75] Inventors: Kenneth Hovstø, Heistad; Kjell Arne Gaarden, Herøya, both of Norway

[73] Assignee: AS Techno Track, Skien, Norway

[21] Appl. No.: 624,426

[22] PCT Filed: Nov. 21, 1994

[86] PCT No.: PCT/NO94/00187
§ 371 Date: May 22, 1996
§ 102(e) Date: May 22, 1996

[87] PCT Pub. No.: WO95/14627
PCT Pub. Date: Jun. 1, 1995

[30] Foreign Application Priority Data

Nov. 22, 1993 [NO] Norway ................... 934221

[51] Int. Cl.[6] .................................. B65G 39/16
[52] U.S. Cl. .............................. 198/806; 198/840
[58] Field of Search ......................... 198/806, 840

[56] References Cited

U.S. PATENT DOCUMENTS

| | | | |
|---|---|---|---|
| 1,217,412 | 2/1917 | Chaplin | 198/806 |
| 2,160,057 | 5/1939 | Carus et al. | 198/806 |
| 3,058,574 | 10/1962 | Gianukos | 198/806 |
| 3,368,665 | 2/1968 | Jinkins | 198/806 |
| 4,506,782 | 3/1985 | Jeanneret et al. | 198/806 |
| 5,609,241 | 3/1997 | Shaw | 198/806 |

FOREIGN PATENT DOCUMENTS

| | | | |
|---|---|---|---|
| 111307 | 8/1980 | Japan | 198/806 |
| 2182905 | 5/1987 | United Kingdom | 198/806 |

*Primary Examiner*—Janice L. Krizek
*Attorney, Agent, or Firm*—Young & Thompson

[57] ABSTRACT

A device for stabilizing the conveyor belt in a self-adjusting belt steering assembly is described. The belt steering assembly has conveyor supporting rollers (1) provided on a rotatable supporting plate (2) which is connected via a longitudinal stay (6) with guide rollers (9). The guide rollers (9) are mounted on a rotatably mounted transverse stay (7). A parallel stay (13) is mounted between the transverse stay (7) and the mounting beam (11, 19) or the foundation for the conveyor belt (5). Thus, when lateral misalignment occurs in the conveyor belt, the guide rollers (9) are kept in an approximately perpendicular position on the conveyor belt's (5) longitudinal axis.

3 Claims, 2 Drawing Sheets

DEVICE FOR STABILIZING THE CONVEYOR BELT IN A SELF-ADJUSTING BELT STEERING ASSEMBLY

The present invention concerns a device for stabilizing the conveyor belt in a self-adjusting belt steering assembly.

There are several known designs for self-adjusting belt steering assemblies. Belt assemblies of this kind have the guide rollers for the conveyor belt mounted on a plate which is rotatable about a shaft. On the plate there is mounted an arm with a transverse stay to which are attached side rollers or side guides which run along the edge of the belt.

The guide rollers or side rollers follow the edge of the conveyor belt. In the event of a lateral misalignment of the conveyor belt the misalignment will be transferred to the supporting rollers which are rotated in a direction which causes the belt to return to its normal position.

In DE 174 491 there is disclosed a device in connection with conveyor belts in order to correct for lateral misalignments which occur during operation and thus return the belt to its normal position. A set of supporting rollers for the conveyor belt is mounted on a plate which is rotatably attached to the base. On the rotatable plate there is mounted an arm with a transverse stay. The arm may be jointed. On the transverse stay there are attached guide rollers which run along the edge of the conveyor belt. The guide rollers follow the edge of the conveyor belt and in the event of a lateral misalignment of the belt, the arm will transfer the displacement and rotate the supporting rollers in a direction which causes the conveyor belt to return to its normal position. In the event of a lateral misalignment the axes of the supporting rollers will be tilted in relation to the direction of travel of the conveyor belt and this oblique position causes the conveyor belt to be returned to its normal position.

When the conveyor belt travels in the direction from the guide rollers towards the supporting rollers, there is a direct transfer between the rollers by means of the arm with the transverse stay where the side rollers are attached.

When the conveyor belt travels in the direction from the supporting rollers towards the guide rollers, it is necessary to use a divided arm with a joint in order for the supporting rollers to be rotated in the correct direction when a lateral misalignment occurs.

It has been shown that known belt training idlers have a tendency to wandering and misalignment especially when there is uneven loading or uneven weight distribution on the conveyor belt, thus causing wear along its edges. The misalignment can be so severe that the conveyor belt can run off the rollers, thus causing a breakdown.

The object of the present invention is to avoid the above-mentioned drawbacks.

A belt training idler which causes less wear on the conveyor belt, thus obtaining an extension of its wear life, will represent a substantial financial gain since the costs of a conveyor belt are normally extremely high. In addition an improvement in the operating conditions, thus avoiding breakdowns, will represent greater efficiency and reduced maintenance expenses.

The surprising discovery has been made that a belt training idler's stability and tendency to misalignment are considerably improved when the side rollers or side guides are kept in a perpendicular position on the conveyor belt.

According to the invention this problem is solved by employing a stay which ensures that the side rollers are kept in as perpendicular a position as possible on the conveyor belt regardless of lateral movement and loading, and which is characterized by those features which are presented in the patent claims.

The invention will now be explained in more detail with reference to drawings which illustrate an embodiment of a belt training idler with the device, only the principles of the invention being illustrated. FIGS. 1-4 show a belt training idler according to the invention. The same references are used in all figures.

Figure 1:
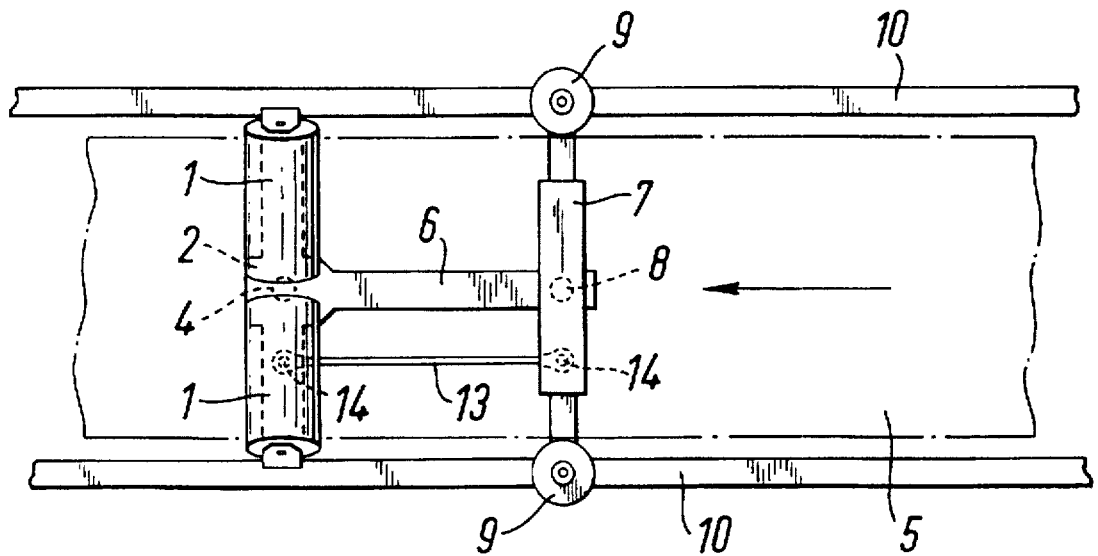
FIGS. 1 and 2 are a sectional elevation and a side view respectively of a belt training idler, where the belt moves from the guide rollers towards the supporting rollers.

The belt training idler can be provided with one or more supporting rollers 1. The supporting rollers 1 are mounted on a plate 2 which is rotatably attached to the base by means of a pivot or a pivot joint 4. The base can be a foundation or a beam 11 mounted between the frame side members 10 of the conveyor belt 5. From the middle of the plate 2 and perpendicular thereto there is attached a lever arm 6 which can be jointed. A transverse stay 7 is rotatably mounted to the lever arm by means of a pivot joint 8. Guide rollers 9 are mounted at each end of the transverse stay 7.

Figure 2:
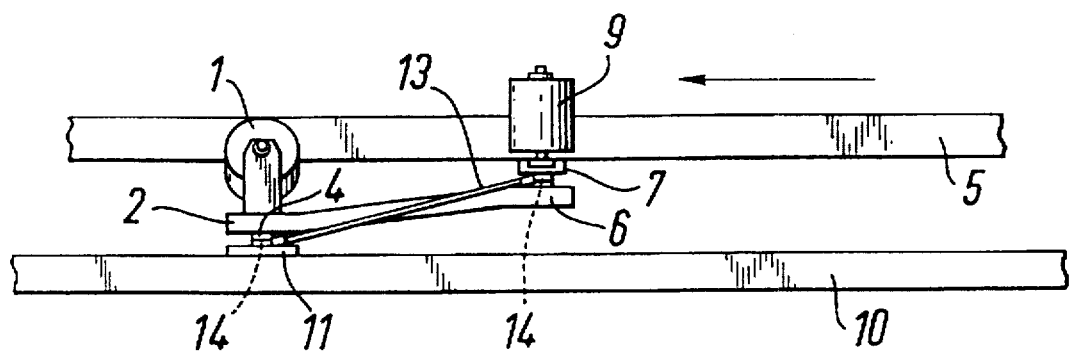

In FIGS. 1 and 2 the conveyor belt 5 moves in the direction from the guide rollers 9 towards the supporting rollers 1. In this case direct transfer is used between the guide rollers 9 and the supporting rollers 1 and the lever arm 6 is not jointed.

Between the transverse stay 7 and the beam 11 there is mounted a parallel stay 13 parallel with the conveyor belt's 5 centre line. The length of the parallel stay 13 is adjusted so that the transverse beam 7 is mounted perpendicular with the conveyor belt's 5 centre line. The parallel stay 13 is rotatably mounted by means of a pivot joint 14 at each end. The parallel stay 13 can also be mounted between the transverse stay 7 and the base of the conveyor belt.

Figure 3:
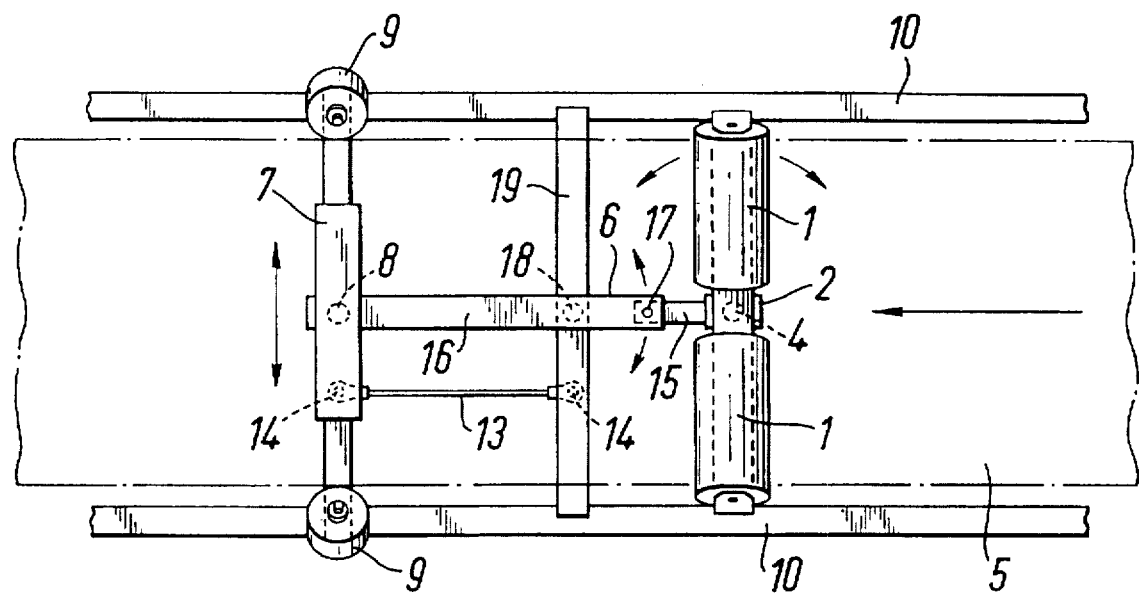
FIGS. 3 and 4 are a sectional elevation and a side view respectively of a belt training idler, where the belt moves from the supporting rollers towards the guide rollers.
Figure 4:
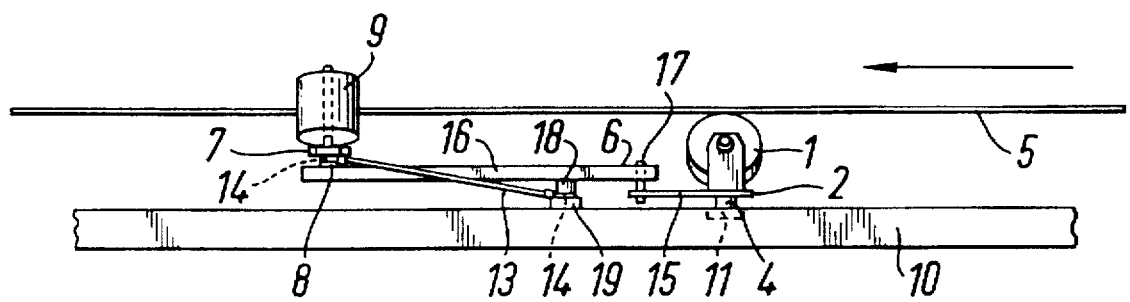

In FIGS. 3 and 4 there is illustrated a belt training idler which corresponds to that shown in FIGS. 1 and 2. In FIGS. 3 and 4 the conveyor belt 5 moves from the supporting rollers 1 towards the guide rollers 9. In order to correct for lateral misalignment of the conveyor belt the supporting rollers must be rotated in the opposite direction. The belt training idler's lever arm 6 is divided into an internal part 15 and an external part 16 and equipped with a pivot joint 17. The internal part of the arm 15 is mounted on the plate 2 which is rotatably secured to the base by means of a pivot or a pivot joint 4.

The external part of the arm 16 is rotatably mounted on the base or a beam 19 by means of a pivot or a pivot joint 18. The beam 19 is mounted between the frame side members 10 of the conveyor belt 5. The transverse stay 7 is rotatably secured to the arm 16 by means of a pivot joint 8. Guide rollers 9 are mounted at each end of the transverse stay 7.

Between the transverse stay 7 and the beam 19 there is mounted a parallel stay 13 parallel with the conveyor belt's 5 centre line. The length of the parallel stay 13 is adjusted so that the transverse beam 7 is mounted perpendicular with the conveyor belt's 5 centre line. The parallel stay 13 is rotatably mounted by means of a pivot joint 14 at each end.

The parallel stay 13 is mounted at a certain distance from the lever arm 6. The greatest stability and effect are achieved when the parallel stay 13 is mounted near the guide rollers 9. A parallel stay 13 may be mounted on both sides of the lever arm 6, 16.

The advantage of the invention is that the parallel stay 13 ensures that the transverse stay 7 with the guide rollers 9 is kept approximately in a perpendicular position on the conveyor belt's 5 centre line regardless of lateral misalignment of the conveyor belt 5 and regardless of uneven weight loading on the conveyor belt 5.

We claim:

1. A conveyor belt aligning device comprising a pair of supporting rollers (1) having axes that intersect at an obtuse angle, said supporting rollers providing an upwardly opening cradle for supporting and centering a conveyor belt resting on said supporting rollers, a frame on which said supporting rollers are mounted, means (4) mounting said frame for horizontal swinging movement about a vertical axis that intersects said axes of said supporting rollers at a common point, guide rollers (9) adapted to engage opposite longitudinal edges of a conveyor belt with said conveyor belt disposed between said guide rollers, and means (6-8, 15-17) interconnecting said guide rollers with said frame such that movement of said guide rollers transversely of the said conveyor belt rotates said frame and causes said supporting rollers to swing about said vertical axis.

2. A device as claimed in claim 1, said interconnecting means including a lever arm (6, 16) connected to said frame, a cross piece (7) interconnecting said guide rollers (9) and means (8) pivotally interconnecting said lever arm and said cross piece (7).

3. A device as claimed in claim 2, and means (18) pivotally mounting said lever arm for horizontal swinging movement about a vertical axis disposed intermediate ends of said lever arm, and means (17) pivotally interconnecting an end of said lever arm with said frame.

* * * * *